(12) United States Patent
Ross et al.

(10) Patent No.: US 10,964,351 B2
(45) Date of Patent: *Mar. 30, 2021

(54) FORENSIC VIDEO RECORDING WITH PRESENCE DETECTION

(71) Applicant: Digital Ally, Inc., Lenexa, KS (US)

(72) Inventors: Stanton E. Ross, Overland Park, KS (US); Peng Han, Overland Park, KS (US); Jeremy A. Dick, Olathe, KS (US)

(73) Assignee: Digital Ally, Inc., Lenexa, KS (US)

(*) Notice: Subject to any disclaimer, the term of this patent is extended or adjusted under 35 U.S.C. 154(b) by 745 days.

This patent is subject to a terminal disclaimer.

(21) Appl. No.: 14/880,453

(22) Filed: Oct. 12, 2015

(65) Prior Publication Data

US 2016/0035391 A1 Feb. 4, 2016

Related U.S. Application Data

(63) Continuation of application No. 14/517,368, filed on Oct. 17, 2014, now Pat. No. 9,159,371, which is a
(Continued)

(51) Int. Cl.
*G11B 27/11* (2006.01)
*H04N 7/18* (2006.01)
(Continued)

(52) U.S. Cl.
CPC .......... *G11B 27/11* (2013.01); *G06K 9/00577* (2013.01); *G06K 19/0723* (2013.01);
(Continued)

(58) Field of Classification Search
None
See application file for complete search history.

(56) References Cited

U.S. PATENT DOCUMENTS 4,409,670 A 10/1983 Herndon et al.
4,789,904 A 12/1988 Peterson
(Continued)

FOREIGN PATENT DOCUMENTS

DE 102010019451 A1 11/2011
EP 2479993 7/2012
(Continued)

OTHER PUBLICATIONS

Automation Systems Article, Know-How Bank Co. Ltd. Takes Leap Forward as a Company Specializing in R&D and Technology Consulting, published Jan. 2005.
(Continued)

*Primary Examiner* — Hung Q Dang
(74) *Attorney, Agent, or Firm* — Erise IP, P.A.

(57) ABSTRACT

At a high level, embodiments of the invention relate to augmenting video data with presence data derived from one or more proximity tags. More specifically, embodiments of the invention generate forensically authenticated recordings linking video imagery to the presence of specific objects in or near the recording. One embodiment of the invention includes video recording system comprising a camera, a wireless proximity tag reader, a storage memory and control circuitry operable to receive image data from the camera receive a proximity tag identifier identifying a proximity tag from the proximity tag reader, and store an encoded frame containing the image data and the proximity tag identity in the storage memory.

20 Claims, 4 Drawing Sheets

Related U.S. Application Data continuation-in-part of application No. 13/967,151, filed on Aug. 14, 2013, now Pat. No. 9,253,452.

(51) Int. Cl.

| | | |
|---|---|---|
| *H04N 5/77* | (2006.01) | |
| *G11B 27/10* | (2006.01) | |
| *G11B 15/02* | (2006.01) | |
| *H04N 5/76* | (2006.01) | |
| *H04H 20/00* | (2009.01) | |
| *G06K 19/07* | (2006.01) | |
| *G06K 9/00* | (2006.01) | |
| *G06T 1/00* | (2006.01) | |
| *G11B 31/00* | (2006.01) | |
| *G08B 13/196* | (2006.01) | |
| *H04N 5/765* | (2006.01) | |

(52) U.S. Cl.
CPC .......... *G06T 1/0028* (2013.01); *G11B 15/026* (2013.01); *G11B 27/10* (2013.01); *G11B 31/006* (2013.01); *H04H 20/00* (2013.01); *H04N 5/76* (2013.01); *H04N 5/772* (2013.01); *H04N 7/181* (2013.01); *H04N 7/188* (2013.01); *G08B 13/19671* (2013.01); *G08B 13/19695* (2013.01); *H04N 5/765* (2013.01)

(56) References Cited

U.S. PATENT DOCUMENTS

| | | | |
|---|---|---|---|
| 4,863,130 A | 9/1989 | Marks, Jr. | |
| 4,918,473 A | 4/1990 | Blackshear | |
| 5,027,104 A | 6/1991 | Reid | |
| 5,096,287 A | 3/1992 | Kaikinami et al. | |
| 5,111,289 A | 5/1992 | Lucas et al. | |
| 5,289,321 A | 2/1994 | Secor | |
| 5,381,155 A | 1/1995 | Gerber | |
| 5,408,330 A | 4/1995 | Squicciarii et al. | |
| 5,446,659 A | 8/1995 | Yamawaki | |
| 5,453,939 A | 9/1995 | Hoffman et al. | |
| 5,473,729 A | 12/1995 | Bryant et al. | |
| 5,479,149 A | 12/1995 | Pike | |
| 5,497,419 A | 3/1996 | Hill | |
| 5,526,133 A | 6/1996 | Paff | |
| 5,585,798 A | 12/1996 | Yoshioka et al. | |
| 5,642,285 A | 6/1997 | Woo et al. | |
| 5,668,675 A | 9/1997 | Fredricks | |
| 5,689,442 A | 11/1997 | Swanson et al. | |
| 5,742,336 A | 4/1998 | Lee | |
| 5,752,632 A | 5/1998 | Sanderson et al. | |
| 5,798,458 A | 8/1998 | Monroe | |
| 5,815,093 A | 9/1998 | Kikinis | |
| 5,850,613 A | 12/1998 | Bullecks | |
| 5,878,283 A | 3/1999 | House et al. | |
| 5,886,739 A * | 3/1999 | Winningstad .......... H04N 7/185 348/115 |
| 5,890,079 A | 3/1999 | Levine | |
| 5,926,210 A | 7/1999 | Hackett et al. | |
| 5,962,806 A | 10/1999 | Coakley et al. | |
| 5,978,017 A | 11/1999 | Tino | |
| 5,983,161 A | 11/1999 | Lemelson et al. | |
| 5,996,023 A | 11/1999 | Winter et al. | |
| 6,008,841 A | 12/1999 | Charlson | |
| 6,028,528 A | 2/2000 | Lorenzetti et al. | |
| 6,052,068 A | 4/2000 | Price R-W et al. | |
| 6,097,429 A | 8/2000 | Seeley et al. | |
| 6,100,806 A | 8/2000 | Gaukel | |
| 6,121,881 A | 9/2000 | Bieback et al. | |
| 6,141,609 A | 10/2000 | Herdeg et al. | |
| 6,141,611 A | 10/2000 | Mackey et al. | |
| 6,163,338 A | 12/2000 | Johnson et al. | |
| 6,175,300 B1 | 1/2001 | Kendrick | |
| 6,298,290 B1 | 10/2001 | Abe et al. | |
| 6,310,541 B1 | 10/2001 | Atkins | |
| 6,314,364 B1 | 11/2001 | Nakamura | |
| 6,324,053 B1 | 11/2001 | Kamijo | |
| 6,326,900 B2 | 12/2001 | Deline et al. | |
| 6,333,694 B2 | 12/2001 | Pierce et al. | |
| 6,333,759 B1 | 12/2001 | Mazzilli | |
| 6,370,475 B1 | 4/2002 | Breed et al. | |
| RE37,709 E | 5/2002 | Dukek | |
| 6,389,340 B1 | 5/2002 | Rayner | |
| 6,396,403 B1 | 5/2002 | Haner | |
| 6,405,112 B1 | 6/2002 | Rayner | |
| 6,449,540 B1 | 9/2002 | Rayner | |
| 6,452,572 B1 | 9/2002 | Fan et al. | |
| 6,490,409 B1 * | 12/2002 | Walker ................ G11B 27/028 348/E5.043 |
| 6,518,881 B2 | 2/2003 | Monroe | |
| 6,525,672 B2 | 2/2003 | Chainer et al. | |
| 6,546,119 B2 | 4/2003 | Ciolli et al. | |
| 6,560,463 B1 | 5/2003 | Santhoff | |
| 6,563,532 B1 | 5/2003 | Strub et al. | |
| 6,591,242 B1 | 7/2003 | Karp et al. | |
| 6,681,195 B1 | 1/2004 | Poland et al. | |
| 6,690,268 B2 | 2/2004 | Schofield et al. | |
| 6,697,103 B1 | 2/2004 | Fernandez et al. | |
| 6,718,239 B2 | 4/2004 | Rayer | |
| 6,727,816 B1 | 4/2004 | Helgeson | |
| 6,748,792 B1 | 6/2004 | Freund et al. | |
| 6,823,621 B2 | 11/2004 | Gotfried | |
| 6,831,556 B1 * | 12/2004 | Boykin .................. H04N 7/181 340/539.1 |
| 6,856,873 B2 | 2/2005 | Breed et al. | |
| 6,883,694 B2 | 4/2005 | Abelow | |
| 6,950,122 B1 | 9/2005 | Mirabile | |
| 6,970,183 B1 | 11/2005 | Monroe | |
| 7,012,632 B2 | 3/2006 | Freeman et al. | |
| 7,034,683 B2 | 4/2006 | Ghazarian | |
| D520,738 S | 5/2006 | Tarantino | |
| 7,038,590 B2 | 5/2006 | Hoffman et al. | |
| 7,071,969 B1 | 7/2006 | Stimson, III | |
| 7,088,387 B1 | 8/2006 | Freeman et al. | |
| 7,119,832 B2 | 10/2006 | Blanco et al. | |
| 7,126,472 B2 | 10/2006 | Kraus et al. | |
| 7,147,155 B2 | 12/2006 | Weekes | |
| 7,180,407 B1 | 2/2007 | Guo et al. | |
| 7,190,822 B2 | 3/2007 | Gammenthaler | |
| 7,363,742 B2 | 4/2008 | Nerheim | |
| 7,371,021 B2 | 5/2008 | Ross et al. | |
| 7,421,024 B2 | 9/2008 | Castillo | |
| 7,436,143 B2 | 10/2008 | Lakshmanan et al. | |
| 7,436,955 B2 | 10/2008 | Yan et al. | |
| 7,448,996 B2 | 11/2008 | Khanuja et al. | |
| 7,456,875 B2 | 11/2008 | Kashiwa | |
| 7,496,140 B2 | 2/2009 | Winningstad et al. | |
| 7,500,794 B1 | 3/2009 | Clark | |
| 7,508,941 B1 | 3/2009 | O'Toole, Jr. et al. | |
| 7,511,737 B2 | 3/2009 | Singh | |
| 7,536,457 B2 | 5/2009 | Miller | |
| 7,539,533 B2 | 5/2009 | Tran | |
| 7,561,037 B1 | 7/2009 | Monroe | |
| 7,594,305 B2 | 9/2009 | Moore | |
| 7,602,301 B1 | 10/2009 | Stirling et al. | |
| 7,656,439 B1 | 2/2010 | Manico et al. | |
| 7,659,827 B2 | 2/2010 | Gunderson et al. | |
| 7,680,947 B2 | 3/2010 | Nicholl et al. | |
| 7,697,035 B1 | 4/2010 | Suber, III et al. | |
| 7,804,426 B2 | 9/2010 | Etcheson | |
| 7,806,525 B2 | 10/2010 | Howell et al. | |
| 7,853,944 B2 | 12/2010 | Choe | |
| 7,944,676 B2 | 5/2011 | Smith et al. | |
| 8,077,029 B1 | 12/2011 | Daniel et al. | |
| 8,121,306 B2 | 2/2012 | Cilia et al. | |
| 8,175,314 B1 | 5/2012 | Webster | |
| 8,269,617 B2 | 9/2012 | Cook et al. | |
| 8,314,708 B2 | 11/2012 | Gunderson et al. | |
| 8,356,438 B2 | 1/2013 | Brundula et al. | |
| 8,373,567 B2 | 2/2013 | Denson | |
| 8,384,539 B2 | 2/2013 | Denny et al. | |
| 8,446,469 B2 | 5/2013 | Blanco et al. | |
| 8,456,293 B1 | 6/2013 | Trundle et al. | |
| 8,508,353 B2 | 8/2013 | Cook et al. | |

(56) References Cited

U.S. PATENT DOCUMENTS

| | | |
|---|---|---|
| 8,594,485 B2 | 11/2013 | Brundula |
| 8,606,492 B1 | 12/2013 | Botnen |
| 8,676,428 B2 | 3/2014 | Richardson et al. |
| 8,707,758 B2 | 4/2014 | Keays |
| 8,725,462 B2 | 5/2014 | Jain et al. |
| 8,744,642 B2 | 6/2014 | Nemat-Nasser et al. |
| 8,780,205 B2 | 7/2014 | Boutell et al. |
| 8,781,292 B1 | 7/2014 | Ross et al. |
| 8,805,431 B2 | 8/2014 | Vasavada et al. |
| 8,849,501 B2 | 9/2014 | Cook et al. |
| 8,854,199 B2 | 10/2014 | Cook et al. |
| 8,890,954 B2 | 11/2014 | O'Donnell et al. |
| 8,930,072 B1 | 1/2015 | Lambert et al. |
| 8,934,045 B2 | 1/2015 | Kam et al. |
| 8,989,914 B1 | 3/2015 | Nemat-Nasser et al. |
| 8,996,234 B1 | 3/2015 | Tamari et al. |
| 9,002,313 B2 | 4/2015 | Sink et al. |
| 9,003,474 B1 | 4/2015 | Smith |
| 9,058,499 B1 | 6/2015 | Smith |
| 9,122,082 B2 | 9/2015 | Abreau |
| 9,123,241 B2 | 9/2015 | Grigsby et al. |
| 9,164,543 B2 | 10/2015 | Minn et al. |
| 9,253,452 B2 | 2/2016 | Ross et al. |
| 9,728,228 B2 | 8/2017 | Palmer et al. |
| 2002/0013517 A1 | 1/2002 | West et al. |
| 2002/0019696 A1 | 2/2002 | Kruse |
| 2002/0032510 A1 | 3/2002 | Turnbull et al. |
| 2002/0044065 A1 | 4/2002 | Quist et al. |
| 2002/0049881 A1 | 4/2002 | Sugimura |
| 2002/0084130 A1 | 7/2002 | Der Gazarian et al. |
| 2002/0131768 A1 | 9/2002 | Gammenthaler |
| 2002/0135336 A1 | 9/2002 | Zhou et al. |
| 2002/0159434 A1 | 10/2002 | Gosior et al. |
| 2002/0191952 A1 | 12/2002 | Fiore et al. |
| 2003/0040917 A1 | 2/2003 | Fiedler |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081934 A1 | 5/2003 | Kirmuss |
| 2003/0081935 A1 | 5/2003 | Kirmuss |
| 2003/0081942 A1 | 5/2003 | Melnyk et al. |
| 2003/0095688 A1 | 5/2003 | Kirmuss |
| 2003/0106917 A1 | 6/2003 | Shelter et al. |
| 2003/0133018 A1 | 7/2003 | Ziemkowski |
| 2003/0151510 A1 | 8/2003 | Quintana et al. |
| 2003/0184674 A1 | 10/2003 | Manico et al. |
| 2003/0185417 A1 | 10/2003 | Alattar et al. |
| 2003/0215010 A1 | 11/2003 | Kashiwa |
| 2003/0215114 A1 | 11/2003 | Kyle |
| 2003/0222982 A1 | 12/2003 | Hamdan et al. |
| 2004/0008255 A1 | 1/2004 | Lewellen |
| 2004/0043765 A1 | 3/2004 | Tolhurst |
| 2004/0143373 A1 | 6/2004 | Ennis |
| 2004/0131184 A1* | 7/2004 | Wu ................... H04N 21/8358 380/202 |
| 2004/0145457 A1 | 7/2004 | Schofield et al. |
| 2004/0150717 A1 | 8/2004 | Page et al. |
| 2004/0168002 A1 | 8/2004 | Accarie et al. |
| 2004/0199785 A1 | 10/2004 | Pederson |
| 2004/0223054 A1 | 11/2004 | Rotholtz |
| 2004/0243734 A1 | 12/2004 | Kitagawa et al. |
| 2004/0267419 A1 | 12/2004 | Jing |
| 2005/0030151 A1 | 2/2005 | Singh |
| 2005/0046583 A1 | 3/2005 | Richards |
| 2005/0050266 A1 | 3/2005 | Haas et al. |
| 2005/0068169 A1 | 3/2005 | Copley et al. |
| 2005/0068417 A1 | 3/2005 | Kreiner et al. |
| 2005/0083404 A1 | 4/2005 | Pierce et al. |
| 2005/0094966 A1 | 5/2005 | Elberbaum |
| 2005/0099498 A1* | 5/2005 | Lao .................. H04N 5/765 348/207.99 |
| 2005/0100329 A1 | 5/2005 | Lao et al. |
| 2005/0101334 A1 | 5/2005 | Brown et al. |
| 2005/0134966 A1 | 5/2005 | Burgner |
| 2005/0132200 A1 | 6/2005 | Jaffe et al. |
| 2005/0151852 A1 | 7/2005 | Jomppanen |
| 2005/0035161 A1 | 8/2005 | Shioda |
| 2005/0185438 A1 | 8/2005 | Ching |
| 2005/0206532 A1 | 9/2005 | Lock |
| 2005/0206741 A1 | 9/2005 | Raber |
| 2005/0228234 A1 | 10/2005 | Yang |
| 2005/0232469 A1 | 10/2005 | Schofield et al. |
| 2005/0243171 A1 | 11/2005 | Ross, Sr. et al. |
| 2006/0009238 A1 | 1/2006 | Stanco et al. |
| 2006/0028811 A1 | 2/2006 | Ross, Jr. et al. |
| 2006/0055786 A1 | 3/2006 | Olilla |
| 2006/0082730 A1 | 4/2006 | Franks |
| 2006/0158968 A1 | 7/2006 | Vanman et al. |
| 2006/0164220 A1 | 7/2006 | Harter, Jr. et al. |
| 2006/0164534 A1 | 7/2006 | Robinson et al. |
| 2006/0170770 A1 | 8/2006 | MacCarthy |
| 2006/0176149 A1 | 8/2006 | Douglas |
| 2006/0183505 A1 | 8/2006 | Willrich |
| 2006/0193749 A1 | 8/2006 | Ghazarian et al. |
| 2006/0202032 A1* | 9/2006 | Kricorissian ........ G06K 7/0004 235/435 |
| 2006/0203090 A1 | 9/2006 | Wang et al. |
| 2006/0208857 A1* | 9/2006 | Wong .................. F41C 33/0209 340/5.82 |
| 2006/0220826 A1 | 10/2006 | Rast |
| 2006/0225253 A1 | 10/2006 | Bates |
| 2006/0232406 A1* | 10/2006 | Filibeck ................. G07C 1/20 340/572.1 |
| 2006/0244601 A1 | 11/2006 | Nishimura |
| 2006/0256822 A1 | 11/2006 | Kwong et al. |
| 2006/0267773 A1 | 11/2006 | Roque |
| 2006/0270465 A1 | 11/2006 | Lee et al. |
| 2006/0271287 A1 | 11/2006 | Gold et al. |
| 2006/0274166 A1 | 12/2006 | Lee et al. |
| 2006/0274828 A1 | 12/2006 | Siemens et al. |
| 2006/0276200 A1 | 12/2006 | Radhakrishnan et al. |
| 2006/0282021 A1 | 12/2006 | DeVaul et al. |
| 2006/0287821 A1 | 12/2006 | Lin |
| 2006/0293571 A1 | 12/2006 | Bao et al. |
| 2007/0021134 A1 | 1/2007 | Liou |
| 2007/0064108 A1 | 3/2007 | Haler |
| 2007/0067079 A1 | 3/2007 | Kosugi |
| 2007/0091557 A1 | 4/2007 | Kim et al. |
| 2007/0102508 A1 | 5/2007 | Mcintosh |
| 2007/0117083 A1 | 5/2007 | Winneg et al. |
| 2007/0132567 A1 | 6/2007 | Schofield et al. |
| 2007/0152811 A1 | 7/2007 | Anderson |
| 2007/0172053 A1 | 7/2007 | Poirier |
| 2007/0177023 A1 | 8/2007 | Beuhler et al. |
| 2007/0195939 A1 | 8/2007 | Sink et al. |
| 2007/0199076 A1 | 8/2007 | Rensin et al. |
| 2007/0213088 A1 | 9/2007 | Sink |
| 2007/0229350 A1 | 10/2007 | Scalisi et al. |
| 2007/0257781 A1 | 11/2007 | Denson |
| 2007/0257782 A1 | 11/2007 | Etcheson |
| 2007/0257804 A1* | 11/2007 | Gunderson .......... G07C 5/0891 340/576 |
| 2007/0257815 A1 | 11/2007 | Gunderson et al. |
| 2007/0260361 A1 | 11/2007 | Etcheson |
| 2007/0268158 A1 | 11/2007 | Gunderson et al. |
| 2007/0271105 A1 | 11/2007 | Gunderson et al. |
| 2007/0274705 A1 | 11/2007 | Kashiwa |
| 2007/0277352 A1 | 12/2007 | Maron et al. |
| 2007/0285222 A1 | 12/2007 | Zadnikar |
| 2007/0287425 A1 | 12/2007 | Bates |
| 2007/0297320 A1 | 12/2007 | Brummette et al. |
| 2008/0001735 A1 | 1/2008 | Tran |
| 2008/0002031 A1* | 1/2008 | Cana .................... G01S 5/0027 348/208.14 |
| 2008/0002599 A1 | 2/2008 | Denny et al. |
| 2008/0030580 A1 | 2/2008 | Kashhiawa et al. |
| 2008/0042825 A1 | 2/2008 | Denny et al. |
| 2008/0043736 A1 | 2/2008 | Stanley |
| 2008/0049830 A1 | 2/2008 | Richardson |
| 2008/0063252 A1 | 3/2008 | Dobbs et al. |
| 2008/0084473 A1 | 4/2008 | Romanowich |
| 2008/0100705 A1 | 5/2008 | Kister et al. |
| 2008/0122603 A1 | 5/2008 | Piante et al. |
| 2008/0129518 A1 | 6/2008 | Carlton-Foss |

(56) References Cited

U.S. PATENT DOCUMENTS

| | | |
|---|---|---|
| 2008/0143481 A1 | 6/2008 | Abraham et al. |
| 2008/0144705 A1 | 6/2008 | Rackin et al. |
| 2008/0169929 A1 | 7/2008 | Albertson et al. |
| 2008/0170130 A1 | 7/2008 | Ollila et al. |
| 2008/0175565 A1 | 7/2008 | Takakura et al. |
| 2008/0211906 A1 | 9/2008 | Lovric |
| 2008/0222849 A1 | 9/2008 | Lavoie |
| 2008/0239064 A1 | 10/2008 | Iwasaki |
| 2008/0246656 A1 | 10/2008 | Ghazarian |
| 2008/0266118 A1 | 10/2008 | Pierson et al. |
| 2008/0307435 A1* | 12/2008 | Rehman ............... G06F 9/542 719/318 |
| 2008/0316314 A1 | 12/2008 | Bedell et al. |
| 2009/0002491 A1 | 1/2009 | Haler |
| 2009/0002556 A1 | 1/2009 | Manapragada et al. |
| 2009/0027499 A1 | 1/2009 | Nicholl |
| 2009/0052685 A1 | 2/2009 | Cilia et al. |
| 2009/0070820 A1 | 3/2009 | Li |
| 2009/0085740 A1 | 4/2009 | Klein et al. |
| 2009/0109292 A1 | 4/2009 | Ennis |
| 2009/0122142 A1 | 5/2009 | Shapley |
| 2009/0135007 A1 | 5/2009 | Donovan et al. |
| 2009/0169068 A1 | 7/2009 | Okamoto |
| 2009/0189981 A1 | 7/2009 | Siann et al. |
| 2009/0195686 A1 | 8/2009 | Shintani |
| 2009/0207252 A1 | 8/2009 | Raghunath |
| 2009/0213204 A1 | 8/2009 | Wong |
| 2009/0225189 A1 | 9/2009 | Morin |
| 2009/0243794 A1 | 10/2009 | Morrow |
| 2009/0251545 A1* | 10/2009 | Shekarri ............... G06Q 10/00 348/158 |
| 2009/0252486 A1 | 10/2009 | Ross, Jr. et al. |
| 2009/0276708 A1 | 11/2009 | Smith et al. |
| 2009/0294538 A1* | 12/2009 | Wihlborg ............... G06Q 30/02 235/454 |
| 2009/0324203 A1 | 12/2009 | Wiklof |
| 2010/0045798 A1 | 2/2010 | Sugimoto et al. |
| 2010/0050734 A1 | 3/2010 | Chou |
| 2010/0060747 A1 | 3/2010 | Woodman |
| 2010/0097221 A1 | 4/2010 | Kreiner et al. |
| 2010/0106707 A1 | 4/2010 | Brown et al. |
| 2010/0118147 A1 | 5/2010 | Dorneich et al. |
| 2010/0122435 A1 | 5/2010 | Markham |
| 2010/0123779 A1 | 5/2010 | Snyder et al. |
| 2010/0177193 A1 | 7/2010 | Flores |
| 2010/0177891 A1 | 7/2010 | Keidar et al. |
| 2010/0188201 A1 | 7/2010 | Cook et al. |
| 2010/0191411 A1 | 7/2010 | Cook et al. |
| 2010/0194885 A1 | 8/2010 | Plaster |
| 2010/0217836 A1 | 8/2010 | Rofougaran |
| 2010/0238009 A1 | 9/2010 | Cook et al. |
| 2010/0238262 A1 | 9/2010 | Kurtz et al. |
| 2010/0242076 A1 | 9/2010 | Potesta et al. |
| 2010/0265331 A1 | 10/2010 | Tanaka |
| 2010/0274816 A1* | 10/2010 | Guzik ............... G11B 27/034 707/802 |
| 2010/0287473 A1 | 11/2010 | Recesso et al. |
| 2011/0006151 A1 | 1/2011 | Beard |
| 2011/0018998 A1* | 1/2011 | Guzik ............... H04N 21/21 348/143 |
| 2011/0050904 A1 | 3/2011 | Anderson |
| 2011/0069151 A1 | 3/2011 | Orimoto |
| 2011/0084820 A1 | 4/2011 | Walter et al. |
| 2011/0094003 A1 | 4/2011 | Spiewak et al. |
| 2011/0098924 A1 | 4/2011 | Baladeta et al. |
| 2011/0129151 A1 | 6/2011 | Saito et al. |
| 2011/0157759 A1 | 6/2011 | Smith et al. |
| 2011/0261176 A1 | 10/2011 | Monaghan, Sr. et al. |
| 2011/0281547 A1 | 11/2011 | Cordero |
| 2011/0301971 A1 | 12/2011 | Roesch et al. |
| 2011/0314401 A1 | 12/2011 | Salisbury et al. |
| 2012/0038689 A1 | 2/2012 | Ishii |
| 2012/0056722 A1 | 3/2012 | Kawaguchi |
| 2012/0063736 A1 | 3/2012 | Simmons et al. |
| 2012/0120258 A1 | 5/2012 | Boutell et al. |
| 2012/0162436 A1 | 6/2012 | Cordell et al. |
| 2012/0188345 A1 | 7/2012 | Salow |
| 2012/0189286 A1 | 7/2012 | Takayama et al. |
| 2012/0195574 A1 | 8/2012 | Wallace |
| 2012/0230540 A1 | 9/2012 | Calman et al. |
| 2012/0257320 A1 | 10/2012 | Brundula et al. |
| 2012/0268259 A1 | 10/2012 | Igel et al. |
| 2012/0276954 A1* | 11/2012 | Kowalsky ............... H04N 5/2252 455/556.2 |
| 2013/0021153 A1 | 1/2013 | Keays |
| 2013/0033610 A1 | 2/2013 | Osborn |
| 2013/0035602 A1 | 2/2013 | Gemer |
| 2013/0080836 A1 | 3/2013 | Stergiou et al. |
| 2013/0096731 A1 | 4/2013 | Tamari et al. |
| 2013/0148295 A1 | 6/2013 | Minn et al. |
| 2013/0222640 A1 | 8/2013 | Baek et al. |
| 2013/0225309 A1 | 8/2013 | Bentley et al. |
| 2013/0285232 A1 | 10/2013 | Sheth |
| 2013/0300563 A1 | 11/2013 | Glaze |
| 2013/0343571 A1 | 12/2013 | Lee |
| 2014/0037262 A1 | 2/2014 | Sako |
| 2014/0040158 A1* | 2/2014 | Dalley, Jr. ............... G06Q 10/06 705/342 |
| 2014/0049636 A1 | 2/2014 | O'Donnell et al. |
| 2014/0092299 A1* | 4/2014 | Phillips ............... H04N 5/2252 348/376 |
| 2014/0094992 A1 | 4/2014 | Lambert et al. |
| 2014/0098453 A1* | 4/2014 | Brundula ............... F41H 5/24 361/232 |
| 2014/0131435 A1* | 5/2014 | Harrington ....... G06K 19/07762 235/375 |
| 2014/0140575 A1 | 5/2014 | Wolf |
| 2014/0170602 A1 | 6/2014 | Reed |
| 2014/0192194 A1 | 7/2014 | Bedell et al. |
| 2014/0195105 A1 | 7/2014 | Lambert et al. |
| 2014/0195272 A1 | 7/2014 | Sadiq et al. |
| 2014/0210625 A1 | 7/2014 | Nemat-Nasser |
| 2014/0218544 A1 | 8/2014 | Senot et al. |
| 2014/0227671 A1 | 8/2014 | Olmstead et al. |
| 2014/0311215 A1 | 10/2014 | Keays et al. |
| 2014/0341532 A1 | 11/2014 | Marathe et al. |
| 2014/0355951 A1 | 12/2014 | Tabak |
| 2015/0050003 A1 | 2/2015 | Ross et al. |
| 2015/0050345 A1 | 2/2015 | Smyth et al. |
| 2015/0051502 A1 | 2/2015 | Ross |
| 2015/0055931 A1* | 2/2015 | Koivukangas ..... H04N 21/2743 386/228 |
| 2015/0053776 A1 | 3/2015 | Rose et al. |
| 2015/0078727 A1 | 3/2015 | Ross et al. |
| 2015/0088335 A1 | 3/2015 | Lambert et al. |
| 2015/0103246 A1 | 4/2015 | Phillips et al. |
| 2015/0229630 A1 | 8/2015 | Smith |
| 2015/0317368 A1* | 11/2015 | Rhoads ............... G06F 17/248 705/311 |
| 2015/0332424 A1* | 11/2015 | Kane ............... H04W 4/08 705/325 |
| 2015/0358549 A1 | 12/2015 | Cho et al. |
| 2016/0006974 A1* | 1/2016 | Pulkkinen ............... H04N 1/2112 386/228 |
| 2016/0042767 A1 | 2/2016 | Araya et al. |
| 2016/0104508 A1 | 4/2016 | Chee et al. |
| 2016/0112636 A1* | 4/2016 | Yamaguchi ........ H04N 5/23245 348/158 |
| 2016/0127695 A1 | 5/2016 | Zhang et al. |
| 2016/0165192 A1 | 6/2016 | Saatchi et al. |
| 2016/0364621 A1 | 12/2016 | Hill et al. |
| 2017/0070659 A1 | 3/2017 | Kievsky et al. |
| 2017/0195635 A1* | 7/2017 | Yokomitsu ............... H04N 7/181 |
| 2017/0230605 A1* | 8/2017 | Han ............... H04N 5/77 |
| 2017/0237950 A1* | 8/2017 | Araya ............... H04N 7/188 386/223 |
| 2017/0244884 A1 | 8/2017 | Burtey et al. |
| 2017/0277700 A1* | 9/2017 | Davis ............... G06F 17/3082 |
| 2017/0287523 A1* | 10/2017 | Hodulik ............... G11B 27/10 |

(56) References Cited

U.S. PATENT DOCUMENTS

| | | | | |
|---|---|---|---|---|
| 2018/0023910 | A1* | 1/2018 | Kramer | F41J 5/10 |
| 2018/0050800 | A1* | 2/2018 | Boykin | B64C 39/024 |

FOREIGN PATENT DOCUMENTS

| | | |
|---|---|---|
| GB | 2273624 | 6/1994 |
| GB | 2320389 | 5/1998 |
| GB | 2343252 | 5/2000 |
| GB | 2351055 | 12/2000 |
| GB | 2417151 | 2/2006 |
| GB | 2425427 | 10/2006 |
| GB | 2455885 | 7/2009 |
| GB | 2485804 A | 5/2012 |
| IE | 20090923 A1 | 9/2010 |
| JP | 294188 | 9/1993 |
| JP | 153298 | 6/1996 |
| JP | 198858 | 7/1997 |
| JP | 10076880 A | 3/1998 |
| JP | 210395 | 7/1998 |
| JP | 2000137263 A | 5/2000 |
| JP | 2005119631 A | 5/2005 |
| KR | 20-0236817 | 8/2001 |
| KR | 1050897 | 7/2011 |
| RU | 2383915 C2 | 3/2010 |
| RU | 107851 U1 | 8/2011 |
| RU | 124780 U1 | 2/2013 |
| WO | 9005076 | 5/1990 |
| WO | 9738526 | 10/1997 |
| WO | 9831146 | 7/1998 |
| WO | 9948308 | 9/1999 |
| WO | 0039556 | 7/2000 |
| WO | 0051360 | 8/2000 |
| WO | 0123214 A1 | 4/2001 |
| WO | 0249881 | 6/2002 |
| WO | 02095757 | 11/2002 |
| WO | 03049446 | 6/2003 |
| WO | 2009013526 A1 | 1/2009 |
| WO | 211001180 A1 | 1/2011 |
| WO | 2012037139 A2 | 3/2012 |
| WO | 2012120083 A1 | 9/2012 |
| WO | 2014000161 A1 | 1/2014 |
| WO | 2014052898 A1 | 4/2014 |

OTHER PUBLICATIONS

Car Rear View Camera—Multimedia Rear View Mirror—4' LCD color monitor, Retrieved from the Internet: <URL: http://web.archive.org/web/20050209014751/http://laipac.com/multimedia-rear-mirror.htm>, Feb. 9, 2005.
ATC Chameleon. Techdad Review [Online] Jun. 19, 2013 [Retrieved on Dec. 30, 2015]. Retrieved from Internet. <URL:http://www.techdadreview.com/2013/06/19atc-chameleon/>.
"Breathalyzer." Wikipedia. Printed Date: Oct. 16, 2014; Date Page Last Modified: Sep. 14, 2014; <http://en.wikipedia.org/wiki/Breathalyzer>.
Dees, Tim; Taser Axon Flex: The next generation of body camera; <http://www.policeone.com/police-products/body-cameras/articles/527231- 0-TASER-Axon-Flex-The-next-generation-of-body-camera/, Date Posted: Mar. 12, 2012; Date Printed: Oct. 27, 2015.
Brown, TP-LINK TL-WDR3500 Wireless N600 Router Review, Mar. 6, 2013.
Controller Area Network (CAN) Overview, National Instruments White Paper, Aug. 1, 2014.
Daskam, Samuel W., Law Enforcement Armed Robbery Alarm System Utilizing Recorded Voice Addresses Via Police Radio Channels, Source: Univ. of Ky, Off of Res and Eng., Serv (UKY BU107), pp. 18-22, 1975.
*Digital Ally* vs. *Taser International, Inc.*, Case No. 2:16-cv-232 (CJM/TJ); US D. Kan, Defendant Taser International Inc.'s Preliminary Invalidity Contentions, Jul. 5, 2016.
Electronic Times Article, published Feb. 24, 2005.
Supplementary European Search Report dated Sep. 28, 2010 in European Patent Application No. 06803645.8; Applicant: Digital Ally, Inc.
W. Fincham, Data Recorders for Accident Investigation, Monitoring of Driver and Vehicle Performance (Digest No. 1997/122), Publication Date: Apr. 10, 1997, pp. 6/1-6/3.
Frankel, Harry; Riter, Stephen, Bernat, Andrew, Automated Imaging System for Border Control, Source: University of Kentucky, Office of Engineering Services, (Bulletin) UKY BU, pp. 169-173, Aug. 1986.
Freudenrich, Craig, Ph.D.; "How Breathalyzers Work—Why Test?." HowStuffWorks. Printed Date: Oct. 16, 2014; Posted Date: Unknown; <http://electronics.howstuffworks.com/gadgets/automotive/breathalyzer1.htm>.
Hankyung Auto News Article, Know-How Bank's Black Box for Cars "Multi-Black Box," Copyright 2005.
Guide to Bluetooth Security: Recommendations of the National Institute of Standards and Technology, National Institute of Standards and Technology, U.S. Dep't of Commerce, NIST Special Publication 800-121, Revision 1 (Jun. 2012).
ICOP Extreme Wireless Mic, Operation Supplement, Copyright 2008.
ICOP Model 20/20-W Specifications; Enhanced Digital In-Car Video and Audio recording Systems, date: Unknown.
ICOP Mobile DVRS; ICOP Model 20/20-W & ICOP 20/20 Vision, date: Unknown.
Bertomen, Lindsey J., PoliceOne.com News; "Product Review: ICOP Model 20/20-W," May 19, 2009.
ICOP Raytheon JPS communications, Raytheon Model 20/20-W, Raytheon 20120 Vision Digital In-Car Video Systems, date: Unknown.
Overview of the IEEE 802.15.4 standards for Low rate Wireless Personal Area Networks, 2010 7th International Symposium on Wireless Communication Systems (ISWCS), Copyright 2010.
Lewis, S.R., Future System Specifications for Traffic Enforcement Equipment, S.R. 1 Source: IEE Colloquium (Digest), N 252, Publication Date: Nov. 18, 1996, pp. 8/1-8/2.
Kopin Corporation; Home Page; Printed Date: Oct. 16, 2014; Posted Date: Unknown; <http://www.kopin.com>.
Translation of Korean Patent No. 10-1050897, published Jul. 20, 2011.
Lilliput RV 18-50NP 5" Rear View Mirror TFT LCD Screen with Camera, Retrieved from the Internet: <URL: http://www.case-mod.com/lilliput-rv1850np-rear-view-mirror-tft-lcd-screen-with-camera-p-1271.html>, Mar. 4, 2005.
Motor Magazine Article, Recreating the Scene of an Accident, published 2005.
New Rearview-Mirror-Based Camera Display Takes the Guesswork Out of Backing Up Retrieved from the Internet: <URL: httb://news.thomasnet.com/fullstory/497750>, Press Release, Oct. 30, 2006.
SIIF Award for Multi Black Box, published Dec. 10, 2004.
Near Field Communication; Sony Corporation; pp. 1-7, Date: Unknown.
Oregon Scientific ATC Chameleon Dual Lens HD Action Camera, http://www.oregonscientificstore.com/Oregon-Scientific-ATC-Chameleon-Dual-Lens-HD-Action-Camera.data, Date Posted: Unknown; Date Printed: Oct. 13, 2014, pp. 1-4.
Asian Wolf High Quality Angel Eye Body Video Spy Camera Recorder System, http://www.asianwolf.com/covert-bodycam-hq-angeleye.html, Sep. 26, 2013, Date Posted: Unknown, pp. 1-3.
Brick House Security Body Worn Cameras / Hidden Cameras / Covert Spy Cameras, http://www.brickhousesecurity.com/body-worn-covert-spy-cameras.html?sf=0#sortblock&CMPID=PD_Google_%22body+camera%22&utm_source=google&utm_medium=cpc&utm_term=%22body+camera%22&mm_campaign=876a94ea5dd198a8c5dc3d1e67eccb34&keyword=%22body+camera%, pp. 1-2, Date: Sep. 26, 2013.
Amazon.com wearable camcorders, http://www.amazon.com/s/ref=nb_sb_ss_i_0_4?url=search alias%3Dphoto&field-keywords=wearable+camcorder&x=0&y=0&sprefix=wear, Sep. 26, 2013, Date Posted: Unknown, pp. 1-4.
Notification of Transmittal of the International Search Report and the Written Opinion of the International Searching Authority, or the

(56) References Cited

OTHER PUBLICATIONS

Declaration dated Feb. 4, 2016; International Application No. PCT/US2015/056052; International Filing Date: Oct. 16, 2015; Applicant: Digital Ally, Inc.
http://www.k-h-b.com/board/board.php?board=products01&comand=body&no=1, Current State of Technology Held by the Company. Copyright 2005.
City of Pomona Request for Proposals for Mobile Video Recording System for Police Vehicles, dated prior to Apr. 4, 2013.
http://www.k-h-b.com/sub1_02.html, Copyright 2005.
Renstrom, Joell; "Tiny 3D Projectors Allow You to Transmit Holograms From a Cell Phone." Giant Freakin Robot. Printed Date: Oct. 16, 2014; Posted Date: Jun. 13, 2014; >http://www.giantfreakinrobot.com/sci/coming-3d-projectors-transmit-holograms-cell-phone.html>.
Request for Comment 1323 of the Internet Engineering Task Force, TCP Extensions for High Performance, Date: May 1992.
RevealMedia RS3-SX high definition video recorder, http://www.revealmedia.com/buy-t166/cameras/rs3-sx.aspx, Sep. 26, 2013, Date Posted: Unknown, pp. 1-2.
Scorpion Micro DV Video Audio Recorder, http://www.leacorp.com/scorpion-micro-dv-video-audio-recorder/, Sep. 26, 2013, Date Posted: Unknown, pp. 1-3.
"Stalker Press Room—Using in-Car Video, the Internet, and the Cloud to keep police officers safe is the subject of CopTrax live, free webinar." Stalker. Printed Date: Oct. 16, 2014; Posted Date: Jul. 31, 2014.
State of Utah Invitation to Bid State Cooperative Contract; Vendor: ICOP Digital, Inc., Contract No. MA503, Jul. 1, 2008.
Wasson, Brian; "Digital Eyewear for Law Enforcement." Printed Date: Oct. 16, 2014; Posted Date: Dec. 9, 2013; <http://www.wassom.com/digital-eyewear-for-law-enforcement.html>.
X26 Taser, Date Unknown.
Taser International; Taser X26 Specification Sheet, 2003.
Digital Ally First Vu Mountable Digital Camera Video Recorder, http://www.opticsplanet.com/digital-ally-first-vu-mountable-digital-camera-video-recorder.html?gclid=CIKohcX05rkCFSlo7AodU0IA0g&ef_id=UjCGEAAAAWGEjrQF:20130925155534:s, Sep. 25, 2013, Date Posted: Unknown, pp. 1-4.
Drift X170, http://driftinnovation.com/support/firmware-update/x170/, Sep. 26, 2013, Date Posted: Unknown, p. 1.
Dyna Spy Inc. hidden cameras, https://www.dynaspy.com/hidden-cameras/spy-cameras/body-worn-wearable-spy-cameras, Sep. 26, 2013, Date Posted: Unknown, pp. 1-3.
International Association of Chiefs of Police Digital Video System Minimum Specifications; Nov. 21, 2008.
Petition for Inter Partes Review No. 2017-00375, *Taser International, Inc.* v. *Digital Ally, Inc.*, filed Dec. 1, 2013.
Petition for Inter Partes Review No. 2017-00376, *Taser International, Inc.* v. *Digital Ally, Inc.*, filed Dec. 1, 2013.
Petition for Inter Partes Review No. 2017-00515, *Taser International, Inc.* v. *Digital Ally Inc.*, filed Jan. 11, 2017.
PCT Patent Application PCT/US16/34345 International Search Report and Written Opinion dated Dec. 29, 2016.
*Digital Ally, Inc.* vs. *Taser International, Inc.*, Case No. 2:16-cv-020232 (CJM/TJ); US D. Kan, Complaint for Patent Infringement, Jan. 14, 2016.
*Digital Ally, Inc.* vs. *Enforcement video LLC d/b/a Watchguard Video.*, Case No. 2:16-cv-02349 (CJIM/TJ); US D. Kan, Complaint for Patent Infringement, May 27, 2016.
State of Utah Invitation to Bid State Cooperative Contract; Vendor: Kustom Signals Inc., Contract No. MA1991, Apr. 25, 2008.
Petition for Inter Partes Review No. 2017-00775, *Taser International, Inc.* v. *Digital Ally Inc.*, filed Jan. 25, 2017.
PCT Patent Application PCT/US17/16383 International Search Report and Written Opinion dated May 4, 2017.
Invalidity Chart for International Publication No. WO2014/000161 Oct. 31, 2017.
Notification of Transmittal of the International Search Report and the Written Opinion of the International Searching Authority, or the Declaration dated Jan. 14, 2016; International Application No. PCT/US2015/056039; International Filing Date: Oct. 16, 2015; Applicant: Digital Ally, Inc.
Ecplaza HY-001HD law enforcement DVR, http://fireeye.en.ecplaza.net/law-enforcement-dvr--238185-1619696.html, Sep. 26, 2013, Date Posted: Unknown, pp. 1-3.
Edesix VideoBadge, http://www.edesix.com/edesix-products, Sep. 26, 2013, Date Posted: Unknown, pp. 1-3.
GoPro Official Website: the World's Most Versatile Camera, http://gopro.com/products/?gclid=CKqHv9jT4rkCFWZkThodyiAAaQ, Sep. 23, 2013, Date Posted: Unknown, pp. 4-9.
Isaw Advance Hull HD EXtreme, www.isawcam.co.kr, Sep. 26, 2013, Date Posted: Unknown, p. 1.
Kustom Signals VieVu, http://www.kustomsignals.com/index.php/mvideo/vievu, Sep. 26, 2013, Date Posted: Unknown, pp. 1-4.
Lea-Aid Scorpion Micro Recorder Patrol kit,http://www.leacorp.com/products/SCORPION-Micro-Recorder-Patrol-kit.html, Sep. 26, 2013, Date Posted: Unknown, pp. 1-2.
Looxcie Wearable & mountable streaming video cams, http://www.looxcie.com/overview?gclid=CPbDyv6piq8CFWeFQAodlhXC-w, Sep. 26, 2013, Date Posted: Unknown, pp. 1-4.
Midland XTC HD Video Camera, http://midlandradio.com/Company/xtc100-signup, Sep. 26, 2013, Date Posted: Unknown, pp. 1-3.
Panasonic Handheld AVCCAM HD Recorder/Player, http://www.panasonic.com/business/provideo/ag-hmr10.asp, Sep. 26, 2013, Date Posted: Unknown, pp. 1-2.
Notification of Transmittal of the International Search Report and the Written Opinion of the International Search Authority, or the Declaration dated Jan. 30, 2014, International Application No. PCT/US2013/062415; International Filing date Sep. 27, 2013, Applicant: Digital Ally, Inc.
Point of View Cameras Military & Police, http://pointofviewcameras.com/military-police, Sep. 26, 2013, Date Posted: Unknown, pp. 1-2.
POV.HD System Digital Video Camera, http://www.vio-pov.com/index.php, Sep. 26, 2013, Date Posted: Unknown, pp. 1-3.
Scorpion Micro DV Video Audio Recorder, http://www.leacorp.com/scorpion-micro-dv-video-audio-recorded, Sep. 26, 2013, Date Posted: Unknown, pp. 1-3.
SIV Security in Vehicle Driving Partner, http://www.siv.co.kr/, Sep. 26, 2013, Date Posted: Unknown, p. 1.
Spy Chest Mini Spy Camera / Self Contained Mini camcorder / Audio & Video Recorder, http://www.spytechs.com/spy_cameras/mini-spy-camera.htm, Sep. 26, 2013, Date Posted: Unknown, pp. 1-3.
Stalker VUE Law Enforcement Grade Body Worn Video Camera/Recorder, http://www.stalkerradar.com/law_vue.shtml, Sep. 26, 2013, Date Posted: Unknown, pp, 1-2.
SUV Cam, http://www.elmo.co.jp/suv-cam/en/product/index.html, Sep. 26, 2013, Date Posted: Unknown, p. 1.
Taser Axon Body on Officer Video/Police Body Camera, http://www.taser.com/products/on-officer-video/axon-body-on-officer-video, Sep. 23, 2013, Date Posted: Unknown, pp. 1-8.
Taser Axon Flex On-Officer Video/Police Video Camera, http://www.taser.com/products/on-officer-video/taser-axon, Sep. 26, 2013, Date Posted: Unknown, pp. 1-8.
Taser Cam Law Enforcement Audio/Video Recorder (gun mounted), http://www.taser.com/products/on-officer-video/taser-cam, Sep. 26, 2013, Date Posted: Unknown, pp. 1-3.
Tide Leader police body worn camera, http://tideleader.en.gongchang.com/product/14899076, Sep. 26, 2013, Date Posted: Unknown, pp. 1-3.
UCorder Pockito Wearable Mini Pocket Camcorder, http://www.ucorder.com/, Sep. 26, 2013, Date Posted: Unknown, p. 1.
Veho MUVI HD, http://veho-uk.fastnet.co.uk/main/shop.aspx?category=CAMMUVIHD, Sep. 26, 2013, Date Posted: Unknown, pp. 1-5.
Veho MUVI portable wireless speaker with dock, http://veho-uk.fastnet.co.uk/main/shop.aspx?category=camcorder, Sep. 26, 2013, Date Posted: Unknown, p. 1.
Vidmic Officer Worn Video & Radio Accessories, http://www.vidmic.com/, Sep. 26, 2013, Date Posted: Unknown, p. 1.
Vievu Products, http://www.vievu.com/vievu-products/vievu-squared/, Sep. 25, 2013, Date Posted: Unknown, pp. 1-2.

(56) References Cited

OTHER PUBLICATIONS

WatchGuard CopVu Wearable Video Camera System, http://watchguardvideo.com/copvu/overview, Sep. 26, 2013, Date Posted: Unknown, pp. 1-2.
Witness Cam headset, http://www.secgru.com/DVR-Witness-Cam-Headset-Video-Recorder-SG-DVR-1-COP.html, Sep. 26, 2013, Date Posted: Unknown, pp. 1-2.
WolfCom 3rd Eye, A/V Recorder for Police and Military, http://wolfcomusa.com/Products/Products.html, Sep. 26, 2013, Date Posted: Unknown, pp. 1-3.
Final Written Decision for Inter Partes Review No. 2017-00375, *Axon Enterprise Inc.* v. *Digital Ally, Inc.*, issued Jun. 1, 2018.
European Patent Application 15850436.6 Search Report dated May 4, 2018.
Invalidity Chart for International Publication No. WO2014/000161 Oct. 31, 2017 (Resubmitted).
Petition for Post Grant Review No. PGR2018-00052, *Axon Enterprise, Inc.* v. *Digital Ally, Inc.*, filed Mar. 19, 201.
Decision Denying Institution of Post Grant Review for Post Grant Review No. PGR2018-00052, *Axon Enterprise, Inc.* v. *Digital Ally, Inc.*, issued Oct. 1, 2018.
Petition for Post Grant Review No. PGR2018-00052, *Axon Enterprise, Inc.* v. *Digital Ally, Inc.*, filed Mar. 19, 2018.
MPEG-4 Coding of Moving Pictures and Audio ISO/IEC JTC1/SC29/WG11 N4668 dated Mar. 2002.

\* cited by examiner

FORENSIC VIDEO RECORDING WITH PRESENCE DETECTION

RELATED APPLICATIONS

This non-provisional patent application is a continuation application and claims priority benefit, with regard to all common subject matter, of commonly assigned U.S. patent application Ser. No. 14/517,368, filed Oct. 17, 2014, and entitled "FORENSIC VIDEO RECORDING WITH PRESENCE DETECTION," which is now U.S. Pat. No. 9,159,371, issued Oct. 13, 2015, ("the '371 patent"). The '371 patent is a continuation-in-part application and claims priority benefit, with regard to all common subject matter, of commonly assigned U.S. patent application Ser. No. 13/967,151, filed Aug. 14, 2013, and entitled "COMPUTER PROGRAM, METHOD, AND SYSTEM FOR MANAGING MULTIPLE DATA RECORDING DEVICES" ("the '151 Application"). The above-referenced patent and application are hereby incorporated by reference in their entirety into the present application.

Embodiments and/or features of the invention described in the present document may be used with the subject matter disclosed in commonly assigned U.S. Pat. No. 8,781,292, filed Sep. 27, 2013, issued Jul. 15, 2014, and entitled "COMPUTER PROGRAM, METHOD, AND SYSTEM FOR MANAGING MULTIPLE DATA RECORDING DEVICES" ("the '292 Patent"), which is a continuation application of the '151 Application. The '292 Patent is hereby incorporated by reference in its entirety into the present application.

Embodiments and/or features of the invention described in the present document may be used with the subject matter disclosed in commonly assigned U.S. patent application Ser. No. 14/040,329, filed Sep. 27, 2013, and entitled "PORTABLE VIDEO AND IMAGING SYSTEM" ("the '329 Application"); and commonly assigned U.S. patent application Ser. No. 14/040,006, filed Sep. 27, 2013, and entitled "MOBILE VIDEO AND IMAGING SYSTEM" ("the '006 Application"). The '329 Application and the '006 Application are hereby incorporated by reference in their entirety into the present application.

Further, embodiments and/or features of the invention described in the present document may be used with the subject matter disclosed in commonly assigned U.S. patent application Ser. No. 14/517,226, filed Oct. 17, 2014, and entitled "DUAL LENS CAMERA UNIT," and with commonly assigned U.S. patent application Ser. No. 14/517,160, filed Oct. 17, 2014, and entitled "BREATH ANALYZER, SYSTEM, AND COMPUTER PROGRAM FOR AUTHENTICATING, PRESERVING, AND PRESENTING BREATH ANALYSIS DATA." Each of these patent applications is also a continuation-in-part of the '151 Application. These patent applications are hereby incorporated by reference in their entirety into the present application.

BACKGROUND

1. Field

Embodiments of the invention generally relate to augmenting video data with presence data derived from one or more proximity tags. More specifically, embodiments of the invention generate forensically authenticated recordings linking video imagery to the presence of specific objects in or near the recording.

2. Related Art

Video recordings of law enforcement activities are becoming more common and more frequently used in legal proceedings. However, it is presently a weakness of such systems that the recordings they produce cannot be verifiably traced back to a specific recording device or authenticated as unaltered. Furthermore, specific objects appearing in the scene cannot be identified. This can be particularly significant when, for example, calibration or identification records for a device need to be produced.

SUMMARY

Embodiments of the invention address the above problems by augmenting video data with presence data derived from one or more proximity tags. A first embodiment of the invention includes a video recording system comprising a camera, a wireless proximity tag reader, a storage memory, and control circuitry operable to receive image data from the camera, receive a proximity tag identifier identifying a proximity tag from the proximity tag reader, and store an encoded frame containing the image data and the proximity tag identity in the storage memory.

In a second embodiment of the invention, a method of recording authenticated video with presence data comprises the steps of creating an augmented encoded frame by encoding video data into an encoded frame, receiving one or more proximity tag identifiers from a proximity tag reader, including the received proximity tag identifiers as metadata for the encoded frame to produce the augmented encoded frame, generating a digital signature for the augmented encoded frame, and storing the augmented encoded frame and digital signature.

In a third embodiment of the invention, a computer-readable medium storing an augmented video file is disclosed, the video file comprising a plurality of augmented frames, each augmented frame of the plurality of augmented frames including video data and one or more identifiers each associated with a proximity tag.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
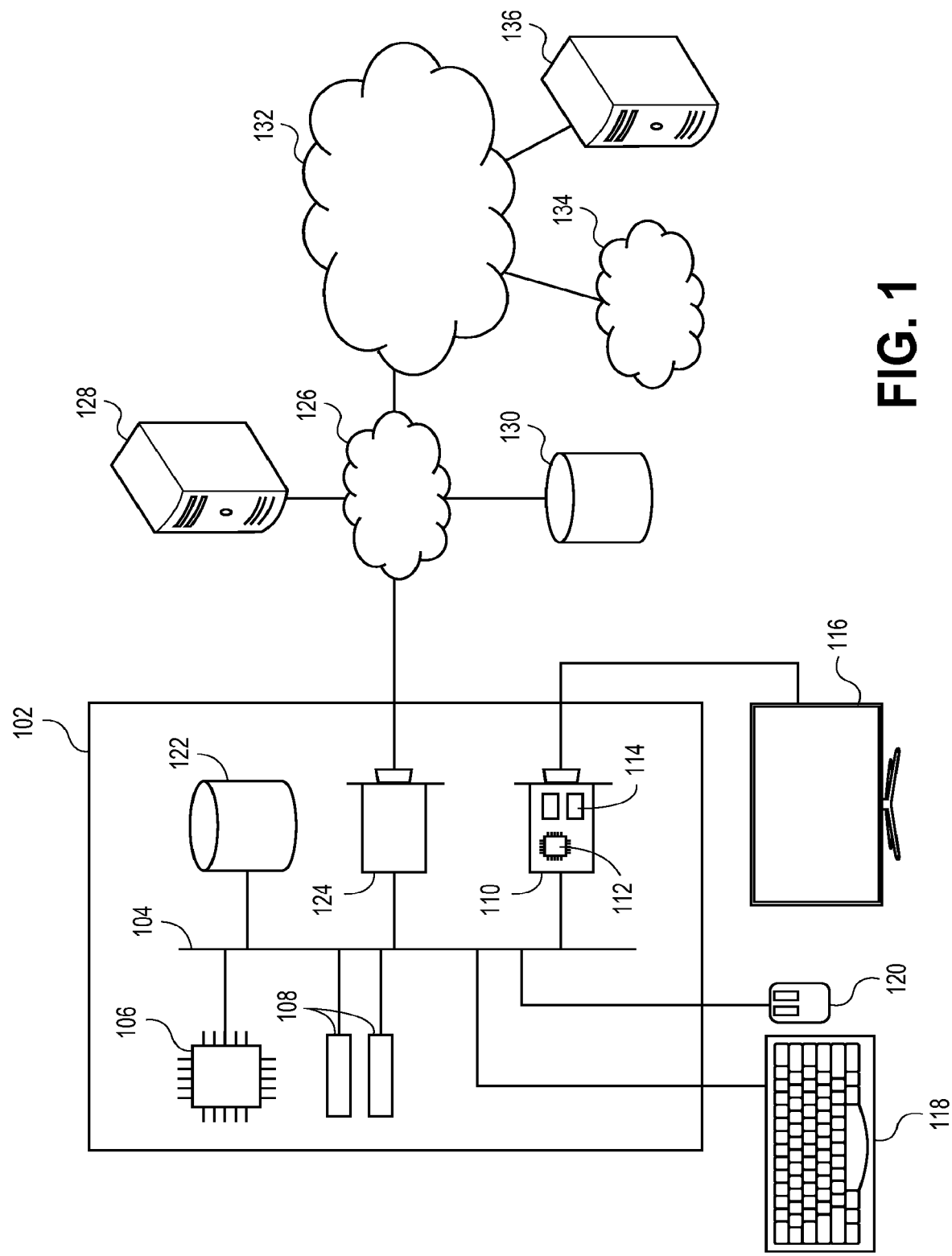
FIG. 1 depicts an exemplary hardware platform of certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Embodiments of the invention may be embodied as, among other things a method, system, or set of instructions embodied on one or more computer-readable media. Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Different forms of computer-readable media store data in different ways. For example, volatile storage media such as RAM may retain data only as long as it is powered, while non-volatile media such as flash memory retain data even when powered off. Furthermore, some forms of computer storage media are write-once, read many (WORM), such that data can be stored to them but not erased or overwritten. For some forms of WORM media, data can be recorded in multiple sessions, where the data from one session is appended to the data from the previous session. Other forms of media may be indefinitely rewriteable. Some forms of media may be encrypted, such that data is written to them encrypted by an encryption key (which can correspond to the device, the user, or be unique in some other way) and data read from them is scrambled unless decrypted with the corresponding decryption key.

Additionally, storage media can be made tamper-resistant such that it is difficult or impossible to alter or erase data stored to them, or to prevent reading data except by authorized means. WORM media or encrypted media, as described above are one way to make storage media tamper resistant. Another way is to make storage media physically difficult to remove, such as by covering them with epoxy after they have been installed. Other methods of making storage resistant tamper resistant are also known in the art and can be used.

A first broad class of embodiments of the invention includes a video recording system comprising a camera, a wireless proximity tag reader, a storage memory, and control circuitry operable to receive image data from the camera, receive a proximity tag identifier identifying a proximity tag from the proximity tag reader, and store an encoded frame containing the image data and the proximity tag identity in the storage memory.

Turning first to FIG. 1, an exemplary hardware platform that can serve as, for example, the control circuitry or other elements of certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules.

Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). In some embodiments, GPU 112 may be used for encoding, decoding, transcoding, or compositing video. Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Finally, network interface card (NIC) 124 is also attached to system bus 104 and allows computer 102 to communicate over a network such as network 126. NIC 124 can be any form of network interface known in the art, such as Ethernet, ATM, fiber, or Wi-Fi (i.e., the IEEE 802.11 family of standards). NIC 124 connects computer 102 to local network 126, which may also include one or more other computers, such as computer 128, and network storage, such as data store 130. Local network 126 is in turn connected to Internet 132, which connects many networks such as local network 126, remote network 134 or directly attached computers such as computer 136. In some embodiments, computer 102 can itself be directly connected to Internet 132.

Figure 2:
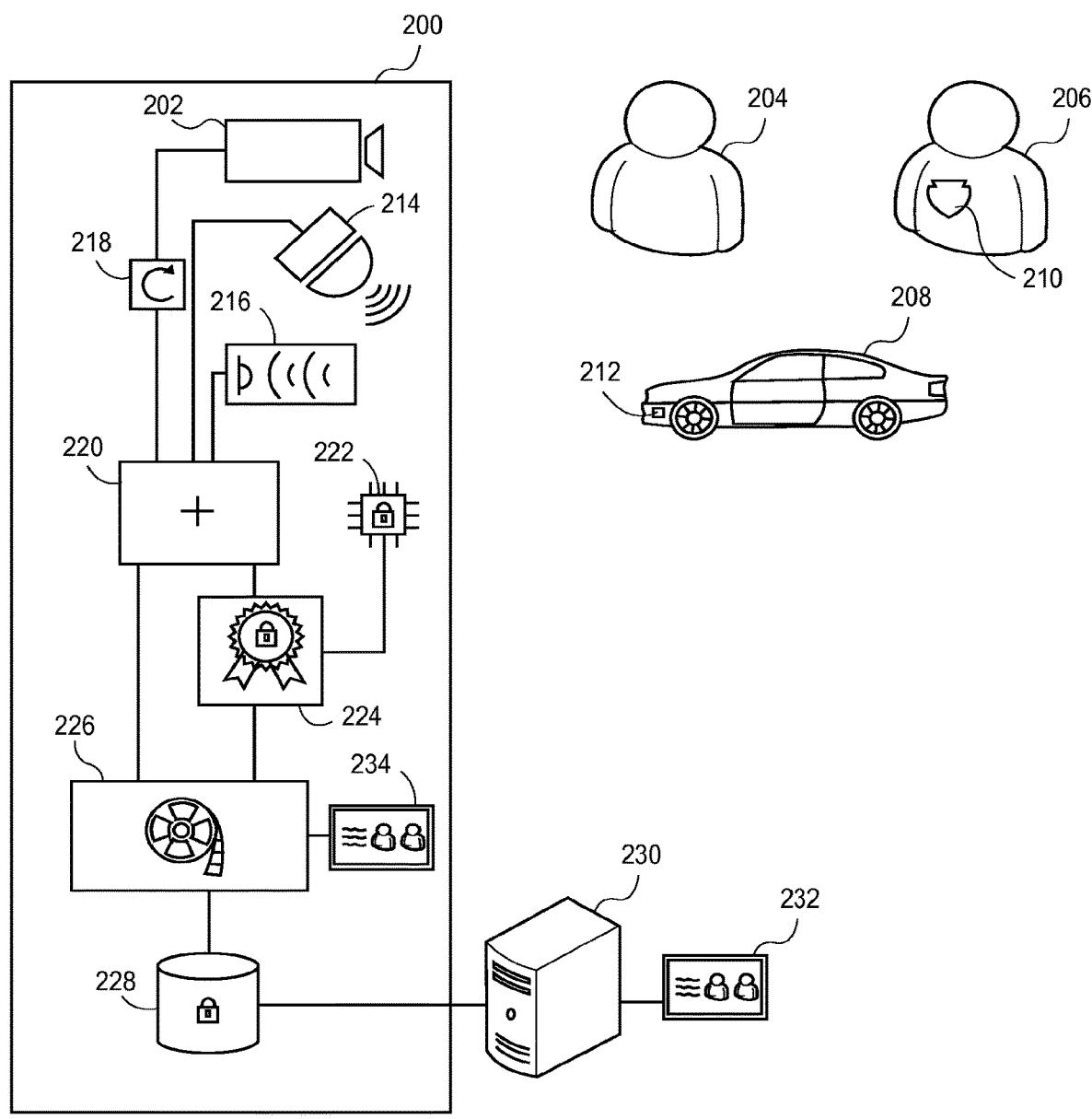
FIG. 2 depicts a system diagram illustrating the components of one embodiment of the invention.

Turning now to FIG. 2, a system diagram illustrating the components of one embodiment of the invention is depicted; the depicted system is generally referred to by reference numeral 200. In this embodiment, one component is camera 202, which captures imagery of a scene including one or more objects. In some embodiments, camera 202 is a still camera. In other embodiments, camera 202 is a video camera. In still other embodiments, a plurality of cameras may be simultaneously capturing imagery of the scene. Camera 202 may be a visible-spectrum camera, an infrared camera, a millimeter-wave camera, a low-light camera, or any other form of imaging device now known in the art or hereafter developed. Camera 202 may also include a microphone to capture audio along with video data.

In this example, the objects in the scene include a suspect 204, a police officer 206, and a patrol cruiser 208. Some objects in the scene may be tagged with proximity tags. Here, officer 206 is wearing a badge that includes proximity tag 210, and patrol cruiser 208 may have an integrated proximity tag 212. In another embodiment, a proximity tag associated with a user is embedded in a credit card-sized proximity card that can be carried in the user's wallet. Furthermore, objects not visible in the scene may also have proximity tags. For example, a second officer standing out of view may have a proximity tag, or officer 206 may have a service weapon that is not visible in the scene but has a proximity tag. Other objects in the scene, such as suspect 204, may not be tagged, or may start untagged and later become tagged. In this exemplary scenario, suspect 204 could become tagged by being restrained with handcuffs containing a proximity tag.

Any object that may need to be specifically identified if it appears in recorded image data can be tagged with a proximity tag. Examples of taggable objects in a law enforcement scenario include badges, service weapons, canine units, patrol cruisers, forensic kits, breath analyzers, radar and lidar guns, and evidence bags. It will be apparent to a person of skill in the art that the objects to be tagged will be different depending on the scenario.

A proximity tag such as proximity tag 210 and 212 is any device that radiates an identifying signal, herein referred to as the proximity tag identifier, that can be read by a corresponding reader such as proximity tag reader 214. Proximity tags can be active (meaning that they periodically broadcast their identifier), assisted passive (meaning that they broadcast their identifier only when interrogated by a signal from the reader), or passive (meaning that they have no power source and must be illuminated by a signal from the proximity tag reader in order to radiate their identifier). Other forms of proximity tags are also possible. Proximity tag identifiers may be preprogrammed into proximity tags, or may be field-programmable, such that the user assigns the identifier when the proximity tag is deployed. One common form of proximity tag system is the radio-frequency identification (RFID) tag and the corresponding RFID reader. Another form of proximity tag system utilizes a challenge-response protocol to avoid the spoofing of a proximity tag identifier. Any form of proximity tag, now known or hereafter developed, can be used.

Proximity tag reader 214 receives the proximity tag identifiers transmitted by proximity tags such as proximity tags 210 and 212. Depending on the type of proximity tag, a different type of reader may be required to receive the proximity tag identifiers. For example, an active reader is required to read passive tags. In some embodiments, proximity tag reader can determine the distance to the transmitting tag based on signal strength or other information. In some embodiments, multiple proximity tag readers are present. In some such implementations, positional information about the tag can be determined based on relative signal strength at each reader.

Also present in system 200 is one or more sensors 216. Sensors 216 collect or receive data to supplement the audiovisual data provided by camera 202. Examples of such sensors include additional microphones for recording supplementary audio data, additional clocks for providing time data, a radio receiver for recording radio transmissions, a global-positioning system (GPS) receiver for recording position data, a breath analyzer for detecting intoxication, a fingerprint reader for logging individual identity, and one or more accelerometers for recording movement and acceleration data. Additional sensors, such as a holster event sensor for detecting when a holster cover is opened or when a weapon is removed from the holster, may be directly or wirelessly connected.

In this embodiment, raw image data from camera 202 is first processed by encoder 218. Raw image data may be encoded by any still image or video codec now known in the art or developed in the future. In particular, many image and video file container formats provide for the addition of metadata to the image or video data. Where such provision is not made, metadata can be stored in an auxiliary file and optionally linked to specific video frames or still images using timestamp data, including a time when the image data was acquired, a filename for where the auxiliary data is stored, or similar.

Combiner 220 combines encoded video data from encoder 218 and proximity tag identity data received from proximity tag reader 220, resulting in an augmented encoded frame. In some embodiments, the identities of multiple proximity tags are added to a single augmented encoded frame. In some embodiments, data from sensors 216 is also added to the augmented encoded frame. In certain embodiments, not every frame is augmented. For example, when encoding MPEG data, identity tag data may only be included with I-frames. In other embodiments, identity tag data may be included in any frame where the set of detected tags changes. In some embodiments, data relating to the signal strength associated with each tag may also be included with the tag identity. In some embodiments with multiple proximity tag readers, the identity of the reader detecting the tag and/or the received signal strength at that reader is also included in the augmented encoded frame.

In some embodiments, augmented encoded frames are further digitally signed by the recording device to verify that they have not been tampered with. To do this, some embodiments use a device-specific key stored in memory 222. In some such embodiments, memory 222 is tamper resistant, such that it is difficult or impossible to extract the device-specific key. The digital signature can be generated by signer 224 using any algorithm for producing digital signatures now known in the art or later developed, including public-key schemes such as the Digital Signature Algorithm (DSA) and keyed hash schemes such as the Hash-based Message Authentication Code (HMAC).

In some embodiments, individual images or frames will be signed. In other embodiments, entire video files are signed. In still other embodiments, groups of frames are collectively signed. In yet other embodiments, only those frames that contain identity tag data are signed. In some embodiments, the digital signatures are stored as metadata with the encoded frame. In other embodiments, the digital signatures are stored as metadata with the container file. In still other embodiments, an auxiliary file containing a detached signature can be generated, potentially with time-stamps corresponding to the frames that are signed.

In this embodiment, augmented frames, together with non-augmented frames when they are present, are combined into a container file format by combiner 226 to produce a final video file. In cases where the image or video file format used makes no provision for embedded metadata, the multiple files containing image data, proximity tag identity data, sensor data and signature data may all be combined into a single file by combiner 226. In other embodiments, combiner 226 may be integrated into encoder 226. In still other embodiments, combiner 226 may re-encode, transcode, or compress data for efficient storage.

In some embodiments, a display such as display 234 may also be present in system 200 for viewing the final video data in real time. In some such embodiments, display 234 may be configured to overlay data such as sensor data and/or proximity tag identity data onto the video data. In other embodiments, display 234 takes the form of a heads-up display that overlays sensor data and/or proximity tag data on the scene as viewed by the user.

The video file produced (in this embodiment) by combiner 226 is stored in data store 228 for subsequent retrieval. In some embodiments, data store 228 takes the form of tamper-proof storage so that the video data, once stored, cannot be deleted or altered. In some embodiments, data store 228 is a remote data store to which data can be uploaded at the end of a shift or in real time. In some such embodiments, a computer such as computer 230 may be able to access the video file in real time for display on display 232 to a remote viewer such as a dispatcher.

In another broad class of embodiments of the invention, a method of recording authenticated video with presence data is disclosed, comprising the steps of creating an augmented encoded frame by encoding video data into an encoded frame, receiving one or more proximity tag identifiers from a proximity tag reader, including the received proximity tag identifiers as metadata for the encoded frame to produce the augmented encoded frame, generating a digital signature for the augmented encoded frame, and storing the augmented encoded frame and digital signature.

Figure 3:
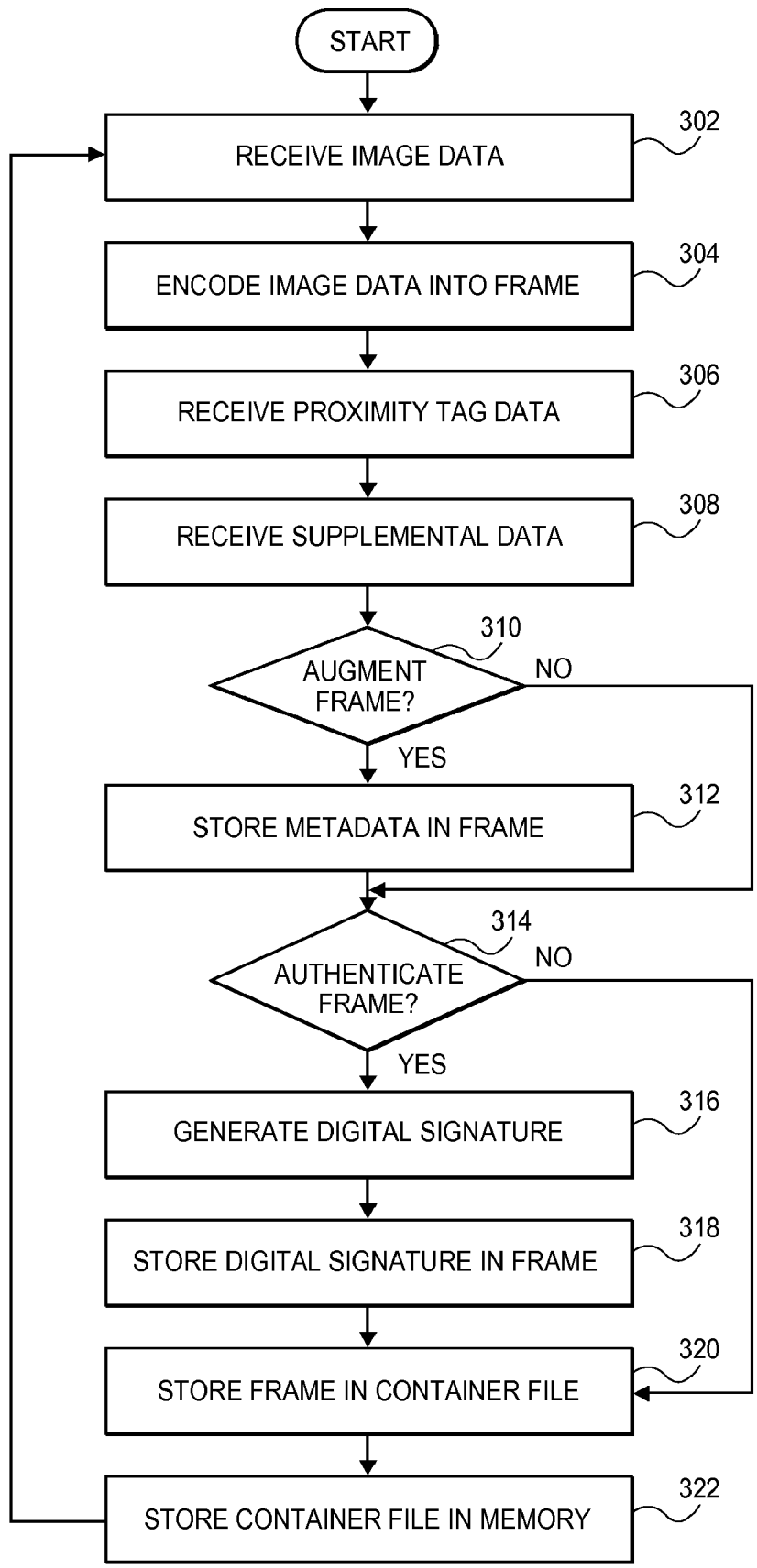
FIG. 3 depicts a flowchart illustrating the operation of one embodiment of the invention.

Turning now to FIG. 3, a flowchart illustrating the operation of one embodiment of the present invention is depicted. The method of creating augmented video may be initiated manually, or by a local or remote sensor-related triggering event. Such a sensor-related triggering event may be generated directly by the sensor, or by a recording device manager, such as a Digital Ally® VuLink®, that controls and synchronizes various recording devices. For example, the recording device manager may communicate (via wireless communication, wired communication, or both) to sensors such as described herein, one or more person-mounted camera units, a vehicle-mounted video camera oriented to observe events external to the vehicle, a vehicle-mounted video camera oriented to observe events internal to the vehicle, and/or one or more storage elements. In some embodiments, the recording device manager detects when one video camera begins recording, and then instructs all other associated devices to begin recording. The recording device manager may also send information indicative of a time stamp to the various recording devices for corroborating the recorded data.

For example, the recording device manager may instruct all associated video cameras to begin recording upon the receipt of a signal from a sensor such as a breath analyzer that a breath analysis has begun. This ensures that multiple video cameras record the breath analysis, for future authentication that the breath analysis was performed correctly. The recording device manager may also send a time stamp to all the associated video cameras to provide a corroboration of the various recorded data.

In another example scenario, an officer wearing a badge with an embedded proximity tag enters a patrol car. Detection of this proximity tag by the recording device manager serves as a triggering event and causes cameras in the patrol car and on the officer's body to begin recording. Proximity tag identifiers associated with both the officer and the patrol car are stored as metadata with both recordings. In this way, not only are the officer and the patrol car associated with each video recording, but the common proximity tag identifier data allows the two video recordings to be associated with each other as well.

The method begins at step 302, when image data is received. In some embodiments, the image data is a single frame of raw video data received from a video camera. In other embodiments, it is a pre-encoded frame or frames from a video camera. In still other embodiments, it is an image received from a still camera. In yet other embodiments, it is image data in any combination of the forms above from a plurality of cameras.

Processing then proceeds to step 304, where the image data received is encoded into a frame. Any image-coding algorithm now known in the art or hereafter developed can be employed for this encoding step. This process can also involve decoding, transcoding, or recoding the image data. Furthermore, if the image data was received in encoded form, no additional encoding may be necessary at this step. In embodiments where image data is received from multiple cameras, this step may also involve synchronizing, merging, and/or combining the image data from the multiple cameras. In some embodiments, image data from multiple cameras may be combined into a single augmented frame; in other embodiments, image data from multiple video cameras is stored in separate video data files. In still other embodiments, features of video codecs and container files allowing multiple camera angles of a single scene may be used to store separate frames containing video data from each of the cameras in the same video data file.

Next, at step 306, proximity tag identity data for one or more proximity tags is received from a proximity reader. In some embodiments, signal strength information or other information relating to the position of the tag relative to the reader is also received. In some embodiments, data is received from a plurality of tag readers. In such embodiments, different tag readers may read tag identity data for some or all of the same proximity tags, or a tag may be read by only one reader of the plurality of tag readers.

At this point processing proceeds to step 308, where supplemental data from a sensor such as sensor 216 is received. In some embodiments, data is received from more than one such sensor. Depending on the type of sensor, data may be received every frame, for a subset of frames, or for only a single frame. Different sensors may provide data at different rates and different times, so that successive frames may have different sets of supplemental data available.

Processing then proceeds to decision 310 where it is determined whether to augment the encoded frame. This determination may be made based on a variety of factors. In some embodiments, every frame is augmented. In other embodiments, only certain types of frame (such as I-frames in MPEG video encoding) are augmented. In still other embodiments, the frame will be augmented if a triggering signal is generated based on data contained in the frame, the proximity tag identity data, and/or the sensor data. For example, the detection of particular tags, or particular numbers or combinations of tags, may always trigger frame augmentation. In general, a triggering event can be any event suggesting that additional context about the frame should be stored.

For example, the user triggering the siren and/or light bar of a patrol cruiser might be a triggering event. Alternately, a velocity or acceleration reading, either from the cruiser or from integrated velocity and/or acceleration sensors may be a triggering event. Similarly, a vehicle crash, detected by an accelerometer reading, airbag deployment, or similar stimulus, might be a trigger event. Additionally, a positional reading could be a triggering event. Such a positional reading could be absolute (for example, entering or exiting a particular geofenced area) or relative (for example, moving more than a particular distance from a patrol cruiser or other fixed or mobile point of reference). A further example of a triggering event is an indication from a sensor configured to detect when a holster cover is opened or when a weapon is removed from the holster. Another form of user-related triggering event could come in the form of one or more biometric stress indications (such as elevated heart rate, blood pressure respiration, etc.) obtained from biometric sensors worn by the user. Similarly, audio data could generate triggering events if raised voices or high levels of vocal stress are detected.

Triggering events can also come from the context of the data being collected. For example, when encoder 218 detects that the video data it is processing contains a face, a triggering event could be generated. Alternately, this functionality could be limited to the recognition of a particular face (for example, if the user sees a face matching a photograph provided with a warrant, or on a wanted poster, a trigger event could be generated). Similar recognition algorithms can be applied to other data streams as well; for example, the audio signature of a gunshot could be a triggering event, or the positional signature of evasive maneuvering.

Additionally, triggering signal can be generated manually by the user or, in embodiments where data is streamed to a remote date store, by a remote observer. Of course, a person of skill in the art will recognize that a wide variety of triggering signals are possible and that variations and combinations of the above will become apparent.

If the determination is made to augment the frame, processing proceeds to step 312; otherwise, processing continues at decision 314. At step 312, some or all of the proximity tag data and supplementary sensor data is stored as metadata for the encoded frame, creating an augmented encoded frame. As discussed above, some video codecs have provision for encoding frame-level metadata. In such embodiments, sensor data and proximity information can be stored directly with the encoded frame. In other cases, it may be desirable to store the proximity tag data and supplementary sensor data as metadata for the video file as a whole. In this case, it may be advantageous to store a timestamp or other frame identifier with the data to associate different sets of supplemental data with their respective encoded frames. In other embodiments, it may be advantageous to leave the video file unaltered and store the proximity tag data and supplementary sensor data in a separate metadata file. Again, storing timestamps or frame identifiers associated with the data may be useful.

Processing now proceeds to decision 314. At this point, a determination of whether to authenticate the (augmented or non-augmented) frame is made. This decision can be based on the same factors as the determination of whether to augment a frame; however, if the computational cost of calculating a digital signature is high, it may not be feasible to calculate a digital authentication for every frame. In some embodiments, only some of the frames are digitally signed. In other embodiments, sets of frames are digitally signed as a group. In still other embodiments, an entire video file is signed as a single unit. If the determination is made to generate a digital signature, processing proceeds to step 316.

At step 316, the digital signature is generated. As discussed above, any digital signature or authentication code algorithm can be used to produce these digital signatures. Next, at step 318, the digital signature is stored. As with the metadata discussed above, digital signatures can be stored with the corresponding frame, with the corresponding video file, or in a separate file. In some embodiments, the digital signature is only calculated for the encoded frame; in other embodiments, the digital signature is calculated for the encoded frame together with any metadata relating to it.

After the digital signature is stored, or if the determination was made at decision 314 not to generate a digital signature, the frame is stored in the container video file at step 320. Any container file format can be used. For example, if the encoded frames are encoded using the MPEG4 Part 10 codec, which is commonly referred to as H.264 codec, a variety of container files including 3GP, DivX, MP4, and MPEG Program Stream can be used. Different video codecs can also use these container file formats or a variety of others. If the original image data was still image data, or if auxiliary files are used for storing metadata or detached digital signatures, an archive file format such as ZIP may be used. In some embodiments, nested container file formats can be used, such as a ZIP file containing an MP4 file containing video, an XML file containing proximity tag and sensor data, and a PGP signature file containing a detached signature.

Finally, at step 322, the container file is written to memory (such as data store 228). In some embodiments, the container file is not written out until video recording completes. In other embodiments, the video file is progressively written out as additional frames are generated. In still other embodiments, intermediate container files are generated and stored, and a final "closed" container is written out once recording terminates. Once the container file is written out, processing returns to step 302, where additional image data can be processed.

In another broad class of embodiments of the invention, a computer-readable medium storing an augmented video file is disclosed, the video file comprising a plurality of augmented frames, each augmented frame of the plurality of augmented frames including video data and one or more identifiers each associated with a proximity tag.

Figure 4A:
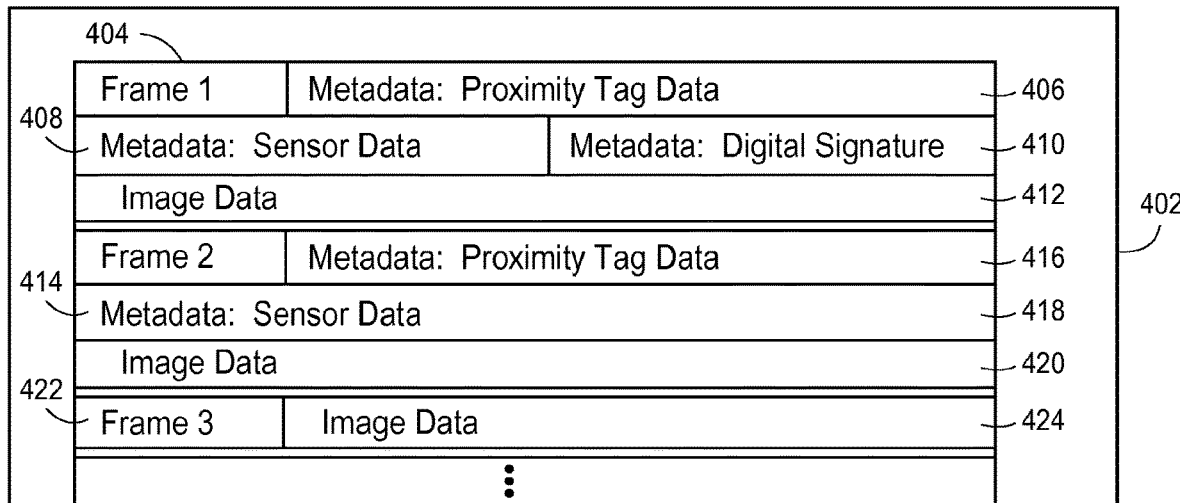
FIGS. 4A and 4B depict illustrative video files produced in accordance with one embodiment of the present invention.
Figure 4B:
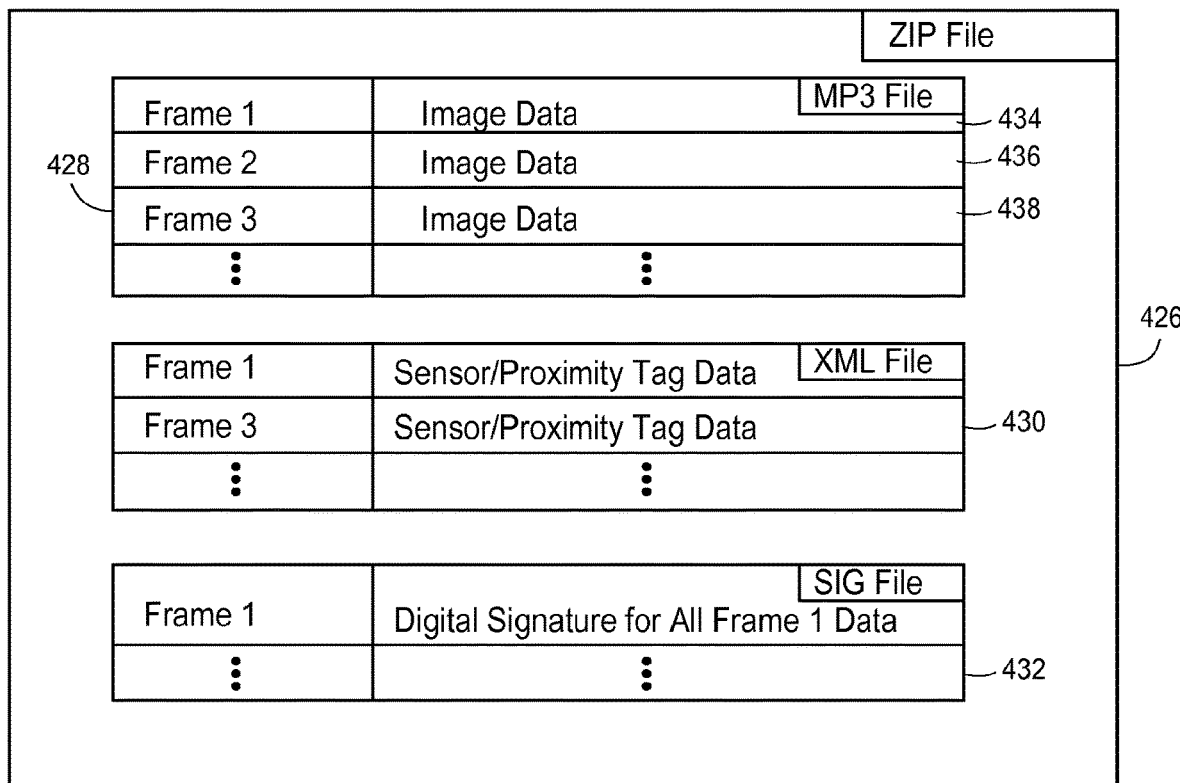

Turning now to FIGS. 4A and 4B, two embodiments of an augmented video file are depicted. In FIG. 4A, an augmented video file 402 that stores proximity tag data, sensor data, and digital signature data as metadata for the associated frame is depicted. Frame 404 is an augmented frame, including metadata fields for proximity tag data 406, sensor data 408, and digital signature 410, which authenticates proximity tag data 406, sensor data 408, and image 412. Also included in frame 404 is the actual image data 412.

Also present in file 402 is frame 414, which is an augmented but non-authenticated frame. Accordingly, there are metadata fields including proximity tag data 416 and sensor data 418 in addition to image data 420. The last depicted frame in file 402 is frame 422, which is a non-augmented, non-authenticated frame. Accordingly, only image data 424 is present (in addition to whatever metadata fields are ordinarily generated in the process of encoding).

FIG. 4B, by contrast, depicts an augmented video file 426 where all metadata is stored in auxiliary files. This may be desirable where, for example, original, unaltered video files are needed for evidentiary purposes. In this embodiment, augmented video file 426 is a ZIP file containing video data file 428, which is in MP4 format, proximity tag and sensor data file 430, which is in XML format, and digital signature file 432, containing ASCII-encoded PGP signatures. A person of skill in the art will immediately recognize that other arrangements and file formats are possible; for example, proximity tag data and sensor data could be in separate files.

Video data file 428 contains image data frames 434, 436, and 438. In some embodiments, these could be identical to image data received from the camera. In other embodiments, these could be re-encoded or transcoded. In this embodiment, proximity tag and sensor data file 430 contains proximity tag and sensor data in XML format. Present with each set of proximity tag and sensor data is a frame identifier associating an image data frame such as image data frame 434 or 438 with the corresponding proximity tag and sensor data.

Finally, video data file 428 contains digital signature file 432 containing detached signatures for one or more video frames and/or the corresponding proximity tag and sensor data. Again, a frame identifier can be included with each digital signature to associate it with the corresponding image data frame.

Video data file 428, alone or in combination with other augmented or non-augmented video files can then be used to document a scene of interest. In some cases, post-processing of one or more video data files will be employed to better reconstruct such a scene. In a law enforcement scenario, for example, at the end of a shift, a large volume of video data may be collected from officers returning to the station house. If an incident of interest occurred during that shift, then it may be desirable to immediately collect all relevant recordings. In some cases, this can be done by searching the metadata embedded in each video for one or more proximity tags relevant to the incident (such as, for example, a proximity tag associated with an officer, vehicle, or object known to have been present at the scene). In this way, all of the augmented video data pertaining to the incident can easily be collected without error or significant labor.

Similarly, augmented video data can easily be searched for any video data matching certain criteria. For example, video data recorded in a certain area can easily be located by searching any location data (such as GPS metadata) stored in or with the video data for corresponding coordinates. Recordings of DUI stops can easily be obtained by searching for video data where a proximity tag associated with a breath analyzer is present. All video recordings of an officer can be quickly collected by searching video data for a proximity tag associated with that officer's badge. Many other applications will quickly become apparent to a person of skill in the art.

Although embodiments of the invention have been discussed in a law enforcement context, a person of skill in the art will realize that numerous other applications immediately present themselves, including inventory and stock control, gaming, and surveillance. Accordingly, the invention is not limited to the context discussed, but can be applied in a wide variety of scenarios.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A non-transitory computer readable storage medium having a computer program stored thereon for associating image data for an event with a presence of a law enforcement officer at the event, wherein execution of the computer program by at least one processor performs the following steps:
   receive an item of image data from an image data recording device mounted on one of the law enforcement officer and a law enforcement vehicle;
   receive an item of proximity tag data from a proximity tag reader, wherein the item of proximity tag data comprises information indicative of an identity of the law enforcement officer and a signal strength received at the proximity tag reader, wherein the law enforcement officer is associated with a proximity tag,
   wherein the proximity tag is a device that radiates an identifying signal that can be read by a corresponding the proximity tag reader;
   combine, using a combiner, the item of image data and the item of proximity tag data including the received signal strength into an augmented frame,
   wherein the item of proximity data is stored as metadata in a header of the augmented frame; and
   after the item of image data and the item of proximity tag data are combined into an augmented frame, store the augmented frame in a video recording to thereby associate the presence of the law enforcement officer with the event and determine positional information of the proximity tag within the video recording based on the received signal strength.

2. The computer readable storage medium of claim 1,
   wherein the law enforcement officer is a first law enforcement officer, the item of image data is a first item of image data, the image data recording device is a first image data recording device, and the proximity tag is a first proximity tag,
   wherein execution of the computer program by the at least one processor performs the following steps:

receive a second item of image data from a second image data recording device, and receive information indicative of an identity of a second law enforcement officer, wherein the second law enforcement officer is associated with a second proximity tag; and store the second item of image data and information indicative of the identity of the second law enforcement officer into the video recording to thereby further associate the presence of the second law enforcement officer with the event.

3. The computer readable storage medium of claim 2, wherein the second image data recording device is mounted on another of the law enforcement officer and the law enforcement vehicle.

4. The computer readable storage medium of claim 1, wherein execution of the computer program by the at least one processor performs the step of receiving sensor data from at least one sensor associated with the event, wherein said video recording further comprises the sensor data to thereby associate the sensor data with the event.

5. The computer readable storage medium of claim 4, wherein the at least one sensor is selected from the group consisting of: a microphone, a clock, a global positioning receiver, a breath analyzer, a fingerprint reader, an accelerometer, and a holster event.

6. The computer readable storage medium of claim 5, wherein the sensor data and the information indicative of the identity of the law enforcement officer are stored as metadata for the event.

7. The computer readable storage medium of claim 6, wherein the sensor data and the information indicative of the identity of the law enforcement officer are stored as metadata for the event.

8. The computer readable storage medium of claim 1, wherein the proximity tag associated with the law enforcement officer is associated with at least one of a law enforcement vehicle, a law enforcement badge, a weapon carried by the law enforcement officer, and officer identification carried by the law enforcement officer.

9. The computer readable storage medium of claim 1, wherein the proximity tag associated with the law enforcement officer is associated with at least one of handcuffs, a breath analyzer, a radar or lidar gun, and an evidence bag.

10. The computer readable storage medium of claim 1, wherein the generation of the video recording is in response to a triggering event.

11. The computer readable storage medium of claim 10, wherein the triggering event is selected from the group consisting of: activation of the law enforcement vehicle's siren or light bar, an acceleration or velocity reading associated with the law enforcement vehicle, a position reading of either the law enforcement officer or the law enforcement vehicle, a holster event, and a biometric stress indicator associated with the law enforcement officer.

12. The computer readable storage medium of claim 1, wherein execution of the computer program by the at least one processor performs the steps of creating a digital signature corresponding to the generated video recording.

13. The computer readable storage medium of claim 1, wherein execution of the computer program by the at least one processor performs the steps of creating a digital signature corresponding to the video recording.

14. A non-transitory computer readable storage medium having a computer program stored thereon for associating data for an event with a presence of a law enforcement device or person at the event, wherein execution of the computer program by at least one processor performs the following steps:

receive a first item of image data from a first image data recording device associated with the event, wherein the first image data recording device is any one of a body-mounted video recording device for a first law enforcement officer, a body-mounted video recording device for a second law enforcement officer, and an in-vehicle video recording device for a law enforcement vehicle;

receive a second item of image data from a second image data recording device associated with the event, wherein the second image data recording device is any one of said body-mounted video recording device for the first law enforcement officer, said body-mounted video recording device for the second law enforcement officer, and said in-vehicle video recording device for the law enforcement vehicle, wherein the first image data recording device is different than the second image data recording device;

receive an item of proximity tag data from a proximity tag reader, wherein the item of proximity tag data comprises information indicative of an identity of a law enforcement officer selected from the set consisting of the first law enforcement officer and the second law enforcement officer, wherein the law enforcement officer is associated with a proximity tag, wherein the proximity tag is a device that radiates an identifying signal that can be read by a corresponding the proximity tag reader, wherein the proximity tag data further comprises a signal strength received at the proximity tag reader;

combine, using a combiner, the first item of image data, the second item of image data, and the item of proximity tag data including the received signal strength into an augmented frame, wherein the item of proximity data is stored as metadata in a header of the augmented frame; and store the augmented frame including the first and second items of image data and the item of proximity tag data a video recording to thereby associate the presence of the law enforcement officer with the event and determine positional information of the proximity tag within the video recording based on the received signal strength.

15. The computer readable storage medium of claim 14, wherein the proximity tag is further associated with at least one of the law enforcement vehicle, a law enforcement badge, a weapon carried by either of the first and the second law enforcement officer, and officer identification carried by either of the first and the second law enforcement officer.

16. The computer readable storage medium of claim 14, wherein the proximity tag is further associated with at least one of handcuffs, a breath analyzer, a radar or lidar gun, and an evidence bag.

17. The computer readable storage medium of claim 14, wherein execution of the computer program by the at least one processor performs the step of receiving sensor data from at least one sensor associated with the event, wherein said video recording further comprises the sensor data to thereby associate the sensor data with the event.

18. The computer readable storage medium of claim 17, wherein the at least one sensor is selected from the group consisting of: a microphone, a clock, a global positioning receiver, a breath analyzer, a fingerprint reader, an accelerometer, and a holster event.

19. The computer readable storage medium of claim 14, wherein the generation of the video recording is in response to a triggering event.

20. The computer readable storage medium of claim 19, wherein the triggering event is selected from the group consisting of: activation of the law enforcement vehicle's siren or light bar, an acceleration or velocity reading associated with the law enforcement vehicle, a position reading of either one of the first and the second law enforcement officers or the law enforcement vehicle, a holster event, and a biometric stress indicator associated with one of the first and the second law enforcement officers.

* * * * *